US008814955B2

(12) United States Patent
Kumeuchi et al.

(10) Patent No.: US 8,814,955 B2
(45) Date of Patent: Aug. 26, 2014

(54) METHOD FOR MANUFACTURING LITHIUM ION SECONDARY BATTERY, AND PACKAGING THEREOF CONTAINING PRE-CHARGED LITHIUM ION SECONDARY BATTERY (75) Inventors: Tomokazu Kumeuchi, Sagamihara (JP); Koichi Zama, Sagamihara (JP); Daisuke Kono, Sagamihara (JP)

(73) Assignee: NEC Energy Devices, Ltd., Kanagawa (JP)

( * ) Notice: Subject to any disclaimer, the term of this patent is extended or adjusted under 35 U.S.C. 154(b) by 0 days.

(21) Appl. No.: 13/510,819

(22) PCT Filed: Sep. 30, 2010

(86) PCT No.: PCT/JP2010/067051
§ 371 (c)(1),
(2), (4) Date: May 18, 2012

(87) PCT Pub. No.: WO2011/061999
PCT Pub. Date: May 26, 2011

(65) Prior Publication Data
US 2012/0227253 A1    Sep. 13, 2012

(30) Foreign Application Priority Data

Nov. 19, 2009  (JP) .................. 2009-263433

(51) Int. Cl.
*H01M 10/44*    (2006.01)
(52) U.S. Cl.
USPC ........................................ 29/623.1
(58) Field of Classification Search
USPC ........................................ 29/623.1
See application file for complete search history.

(56) References Cited

U.S. PATENT DOCUMENTS

2004/0043300 A1*  3/2004  Utsugi et al. .................. 429/329
2007/0212614 A1*  9/2007  Kim et al. ..................... 429/307

(Continued)

FOREIGN PATENT DOCUMENTS

| CN | 1495959 A | 5/2004 |
| CN | 101286578 A | 10/2008 |

(Continued)

OTHER PUBLICATIONS

International Search Report for PCT/JP2010/067051 dated Nov. 2, 2010.

(Continued)

*Primary Examiner* — Ula C Ruddock
*Assistant Examiner* — Frank Chernow
(74) *Attorney, Agent, or Firm* — Sughrue Mion, PLLC (57) ABSTRACT There is provided a lithium ion secondary battery exhibiting a high capacity retention rate over a long period. There is also provided a method for manufacturing a lithium ion secondary battery including a positive electrode, a negative electrode containing a negative electrode active material layer containing a graphite, an aprotic electrolyte solution containing a sulfonate ester having at least two sulfonyl groups, and a packaging material including a laminate film involving the positive electrode, the negative electrode and the aprotic electrolyte solution, the method including: enclosing the positive electrode, the negative electrode and the aprotic electrolyte solution in the packaging material to fabricate a lithium ion secondary battery before pre-charge; pre-charging the lithium ion secondary battery; and opening the enclosure of the packaging material of the lithium ion secondary battery after pre-charge, thereafter vacuum sealing the packaging material, and regularly charging the lithium ion secondary battery after pre-charge, wherein the current for the pre-charge is 0.05 to 0.25 C, and the voltage thereof is 3.3 to 3.5 V.

5 Claims, 5 Drawing Sheets

(56) References Cited

U.S. PATENT DOCUMENTS

| | | | |
|---|---|---|---|
| 2010/0062332 A1* | 3/2010 | Kumeuchi | 429/200 |
| 2011/0206999 A1* | 8/2011 | Jeon et al. | 429/338 |

FOREIGN PATENT DOCUMENTS

| | | |
|---|---|---|
| JP | 5-290846 A | 11/1993 |
| JP | 2004-30957 A | 1/2004 |
| JP | 2004-139961 A | 5/2004 |
| JP | 2004-281368 A | 10/2004 |
| JP | 2005-276782 A | 10/2005 |
| JP | 2006-351332 A | 12/2006 |
| JP | 2008-153118 A | 7/2008 |
| JP | 2009-283276 A | 12/2009 |

OTHER PUBLICATIONS

Communication dated Feb. 12, 2014, issued by the State Intellectual Property Office of the People's Republic of China in corresponding Application No. 201080052252.9.

* cited by examiner

METHOD FOR MANUFACTURING LITHIUM ION SECONDARY BATTERY, AND PACKAGING THEREOF CONTAINING PRE-CHARGED LITHIUM ION SECONDARY BATTERY

CROSS REFERENCE TO RELATED APPLICATIONS

This application is a National Stage of International Application No. PCT/JP2010/067051 filed Sep. 30, 2010, claiming priority based on Japanese Patent Application No. 2009-263433 filed Nov. 19, 2009, the contents of all of which are incorporated herein by reference in their entirety.

TECHNICAL FIELD

The present invention relates to a method for manufacturing a lithium ion secondary battery.

BACKGROUND ART

Lithium ion secondary batteries and the like having a large charge/discharge capacity are broadly used for portable devices using batteries including cell phones. Lithium ion secondary batteries having a large charge/discharge capacity and an excellent efficiency are demanded also in applications such as electric bicycles, electric cars, electric tools and electric power storage.

Various materials and techniques are proposed for improvements in characteristics, particularly improvements in charge/discharge cycle characteristics and storage characteristics over a long period, of lithium ion secondary batteries. As one of the techniques, a nonaqueous electrolyte solution secondary battery using an aprotic electrolyte solution containing a sulfonate ester having at least two sulfonyl groups is proposed.

Patent Literature 1 discloses that the fabrication of a secondary battery using an electrolyte solution containing a cyclic sulfonate ester having at least two sulfonyl groups as an aprotic solvent can improve the charge/discharge efficiency of the secondary battery and can improve the cycle characteristics of the secondary battery.

Patent Literature 2 discloses that the use of an electrolyte solution for a secondary battery containing a chain disulfonate ester as an aprotic solvent and the carrying out of the charge/discharge at a predetermined temperature can provide an excellent lithium ion secondary battery exhibiting excellent storage characteristics, good cycle characteristics, small voltage drop and small volume increase.

On the other hand, carbonaceous negative electrode active materials of lithium ion secondary batteries are roughly divided into two types: amorphous carbon having a low crystallinity and graphite having high crystallinity. Since graphite of these has a high initial reversible capacity, and the electrode density of a sheet electrode can be made high, the graphite is applied to applications requiring a high energy density.

CITATION LIST

Patent Literature

Patent Literature 1: JP2004-281368A
Patent Literature 2: JP2006-351332A

SUMMARY OF INVENTION

Technical Problem

However, in a lithium ion secondary battery containing an aprotic electrolyte solution containing a sulfonate ester having at least two sulfonyl groups, and a graphite as a negative electrode active material, a lithium compound deposits on the negative electrode in the initial charge after the fabrication of the battery, and the charge/discharge cycle characteristics decrease in some cases.

An object of the present invention is to provide a method for manufacturing a lithium ion secondary battery containing an aprotic electrolyte solution containing a sulfonate ester having at least two sulfonyl groups, and a graphite as a negative electrode active material, in which in the battery no lithium compound deposits on the negative electrode during the initial charge after the fabrication of the battery, and the charge/discharge cycle characteristics over a long period are excellent.

That is, the technical object of the present invention is to provide a method for manufacturing a lithium ion secondary battery exhibiting a high capacity retention rate over a long period.

Solution to Problem

The method for manufacturing of a lithium ion secondary battery according to the present invention is a method for manufacturing a lithium ion secondary battery including a positive electrode, a negative electrode including a negative electrode active material layer containing a graphite, an aprotic electrolyte solution containing a sulfonate ester having at least two sulfonyl groups, and a packaging material including a laminate film involving the positive electrode, the negative electrode and the aprotic electrolyte solution, the method including: enclosing the positive electrode, the negative electrode and the aprotic electrolyte solution in the packaging material to fabricate a lithium ion secondary battery before pre-charge; pre-charging the lithium ion secondary battery; and opening the enclosure of the packaging material of the lithium ion secondary battery after pre-charge, thereafter vacuum sealing the packaging material, and regularly charging the lithium ion secondary battery after pre-charge, wherein the current for the pre-charge is 0.05 C or larger and 0.25 C or smaller, and the voltage thereof is 3.3 V or higher and 3.5 V or lower.

In the method for manufacturing a lithium ion secondary battery according to the present invention, the sulfonate ester is a cyclic sulfonate ester represented by the following formula (1).

[Formula 1]

(1)

wherein Q denotes an oxygen atom, a methylene group or a single bond; A1 denotes a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which alkylene units or fluoroalkylene units are bonded through an ether bond; and A2 denotes a substituted or unsubstituted alkylene group, a substituted or unsubstituted fluoroalkylene group or an oxygen atom.

In the method for manufacturing a lithium ion secondary battery according to the present invention, the sulfonate ester is a chain sulfonate ester represented by the following formula (2).

[Formula 2]

(2)

wherein $R_1$ and $R_4$ each independently denote an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_1$ (wherein $X_1$ is a substituted or unsubstituted alkyl group having 1 to 5 carbon atoms), —$SY_1$ (wherein $Y_1$ is a substituted or unsubstituted alkyl group having 1 to 5 carbon atoms), —COZ (wherein Z is a hydrogen atom or a substituted or unsubstituted alkyl group having 1 to 5 carbon atoms), and a halogen atom; and $R_2$ and $R_3$ each independently denote an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_2X_3$ (wherein $X_2$ and $X_3$ are each independently a hydrogen atom or a substituted or unsubstituted alkyl group having 1 to 5 carbon atoms), and —$NY_2CONY_3Y_4$ (wherein $Y_2$ to $Y_4$ are each independently a hydrogen atom or a substituted or unsubstituted alkyl group having 1 to 5 carbon atoms).

In the method for manufacturing a lithium ion secondary battery according to the present invention, the pre-charge is carried out at 10° C. or higher and lower than 30° C.

In the method for manufacturing a lithium ion secondary battery according to the present invention, a battery element having the positive electrode and the negative electrode enclosed in the packaging material has a laminated structure.

Advantageous Effects of Invention

The present invention can provide a method for manufacturing a lithium ion secondary battery in which no lithium compound deposits on the negative electrode active material layer, and which exhibits a high capacity retention rate over a long period.

DESCRIPTION OF EMBODIMENTS

The present exemplary embodiment will be described. As a result of various studies, the present inventors have found that in manufacturing a lithium ion secondary battery including a positive electrode, a negative electrode including a negative electrode active material layer containing a graphite, an aprotic electrolyte solution containing a sulfonate ester having at least two sulfonyl groups, and a packaging material including a laminate film involving the positive electrode, the negative electrode and the aprotic electrolyte solution, when a method of initial charge is carried out under certain conditions, no lithium compound deposits on the negative electrode active material layer.

Figure 1:
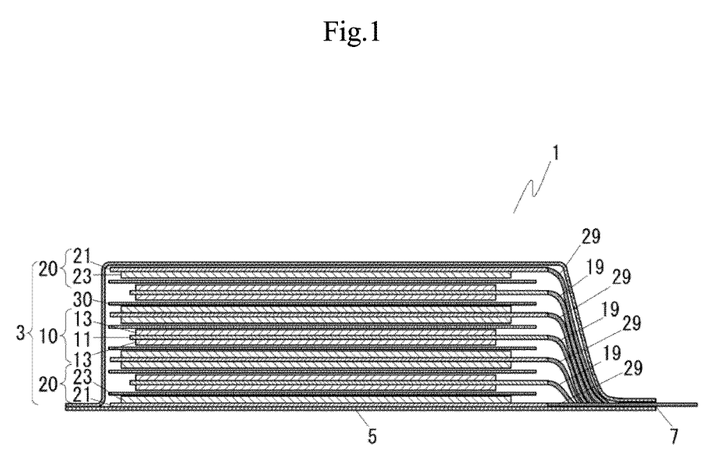
FIG. 1 is a schematic cross-sectional diagram of a lithium ion secondary battery according to the present exemplary embodiment.

FIG. 1 is a schematic cross-sectional diagram of a lithium ion secondary battery 1 according to the present exemplary embodiment. A battery element 3 having a laminated structure in which a positive electrode sheet 10 and a negative electrode sheet 20 are laminated with a separator 30 sandwiched therebetween is sealed with a filmy packaging material 5.

In the positive electrode sheet 10, positive electrode active material layers 13 are formed on a positive electrode current collector 11 including an aluminum foil or the like. Further in the negative electrode sheet 20, the area of which is larger than the positive electrode sheet 10, negative electrode active material layers 23 are formed on a negative electrode current collector 21 including a copper foil or the like.

A positive electrode lead terminal 19 and a negative electrode lead terminal 29 are each thermally fused or otherwise at a sealing portion 7 of the filmy packaging material 5, and extend to the outside, and the sealing is carried out in a reduced-pressure state after an electrolyte solution has been injected in the inside. By a pressure difference due to the reduced-pressure between the inside and the outside, the filmy packaging material 5 presses the battery element 3 in which the positive electrode sheets 10 and the negative electrode sheets 20 are laminated.

In the present exemplary embodiment, the positive electrode active materials usable are lithium cobaltate, lithium nickelate and lithium manganate, which are lithium-containing transition metal oxides.

Lithium cobaltate usable is usual $LiCoO_2$ having a plateau at nearly 4 V in a metallic Li counter electrode. In order to improve the thermal stability and in order not to make the crystal structure unstable even in the case where the amount of the extracted Li becomes large, lithium cobaltate can be used in which the surface may be modified with Mg, Al, Zr or the like, or Co sites may be doped or substituted therewith.

Lithium nickelate usable is, in order to have a plateau at nearly 4 V in a metallic Li counter electrode and in order to make the thermal stability and the cycle characteristics good, $LiNi_{1-x}Co_xO_2$ ($0.1 \leq x \leq 0.3$) in which Ni sites are partially substituted with Co, and $LiNi_{1-x-y}Co_xAl_yO_2$ (wherein $0.1 \leq x \leq 0.3$ and $0.02 \leq y \leq 0.1$) in which Al is further doped.

Lithium manganate usable is $Li_{1+x}Mn_{2-x-y}M_yO_{4-z}$ (wherein $0.03 \leq x \leq 0.16$, $0 \leq y < 0.1$ and $-0.1 \leq z \leq 0.1$; M is at least one selected from Mg, Al, Ti, Co and Ni) which has a plateau at nearly 4 V in a metallic Li counter electrode. The particle shape of lithium manganate may be massive, spherical, platy or the like, and is not especially limited. The particle diameter and the specific surface area can also be selected suitably in consideration of the film thickness of a positive electrode active material layer, the electrode density of the positive electrode active material layer, the kind of a binder and the like. However, in order to hold the energy density high, it is desirable to select the particle shape, the particle size distribution, the average particle diameter, the specific surface area and the true density such that the electrode density of the positive electrode active material layer of the portion obtained by removing a current collector metal foil becomes 2.8 g/cc or higher. It is also desirable to select the particle shape, the particle size distribution, the average particle diameter, the specific surface area and the true density such that the mass ratio taken by a positive electrode active material in a positive electrode mix including the positive electrode active material, a binder, a conductivity imparting agent and the like becomes 80% or higher.

As starting raw materials used in the synthesis of $Li_{1+x}Mn_{2-x-y}M_yO_{4-z}$ (wherein $0.03 \leq x \leq 0.16$, $0 \leq y < 0.1$ and $-0.1 \leq z \leq 0.1$; M is at least one selected from Mg, Al, Ti, Co and Ni), the following raw materials can be used. Li sources usable are $Li_2CO_3$, LiOH, $Li_2O$, $Li_2SO_4$ and the like, and the maximum particle diameter thereof is suitably 2 μm or smaller from the viewpoint of the reactivity with Mn sources and the improvement in the crystallinity of a lithium manganate to be synthesized. Mn sources usable are $MnO_2$, $Mn_2O_3$, $Mn_3O_4$, MnOOH, $MnCO_3$, $Mn(NO_3)_2$ and the like, and the maximum particle diameter is desirably 30 μm or smaller. Among the above raw materials, $Li_2CO_3$ is especially preferable as the Li sources, and $MnO_2$, $Mn_2O_3$ or $Mn_3O_4$ is especially preferable as the Mn sources, from the viewpoint of the cost, the ease of handling and the ease of providing a positive electrode active material exhibiting a high filling property. These may be used singly or concurrently in two or more.

Hereinafter, a synthesis method will be described. The above starting raw materials are suitably selected, and weighed and mixed so as to make a predetermined metal compositional ratio. At this time, in order to make the reactivity of Li sources and Mn sources good, and in order to avoid remaining of a $Mn_2O_3$ heterophase, it is preferable that the maximum particle diameter of the Li sources is 2μm or smaller, and that of the Mn sources is 30 μm or smaller. The mixing is carried out using a ball mill, a V-type mixer, a cutter mixer, a shaker or the like, and the apparatus may be selected suitably. A mixed powder obtained is calcined in the temperature range of 600° C. to 950° C. in an atmosphere of an oxygen concentration which is the one or higher than in the air.

A positive electrode active material prepared by mixing lithium manganate and lithium nickelate in a mass ratio in the range of 90:10 to 50:50 is mixed with a binder species, and a conductivity imparting agent such as acetylene black or carbon to thereby make a positive electrode mix. The binder usable is a resinous binder usually used, and is polyvinylidene fluoride (PVdF), polytetrafluoroethylene (PTFE) or the like. The positive electrode mix is applied on a current collector metal foil by a well-known method, and dried to thereby fabricate a positive electrode. The current collector metal foil is preferably an Al foil.

In the present exemplary embodiment, a negative electrode active material to be used is a graphite. The graphite is preferably one which is capable of intercalating and releasing lithium, is excellent in the initial charge/discharge efficiency, has a high crystallinity, and has an average particle diameter ($D_{50}$) of 15 to 50 μm and a BET specific surface area of 0.4 to 2.0 m²/g. The graphite is mixed with a binder species suitably selected according to characteristics important as batteries, such as rate characteristics, output characteristics, low-temperature discharge characteristics, pulse discharge characteristics, energy density, light weight and small size, to thereby make a negative electrode mix. The binder usable may be polyvinylidene fluoride (PVdF), polytetrafluoroethylene (PTFE) or the like usually used, and may additionally be a rubbery binder. The negative electrode mix is applied on a current collector metal foil by a well-known method, and dried to thereby fabricate a negative electrode. The current collector metal foil is preferably a Cu foil.

A separator to be used is preferably a polypropylene, or a porous plastic film having a three-layered structure of a polypropylene, a polyethylene and a polypropylene. The thickness of the separator is not especially limited, but is preferably 10 μm to 30 μm in consideration of the rate characteristics and the energy density and the mechanical strength of a battery.

A solvent usable for an aprotic electrolyte solution is a solvent usually used, and for example, carbonates, ethers, ketones and the like can be used. Preferably used is a mixed liquid of at least one selected from ethylene carbonate (EC), propylene carbonate (PC), γ-butyrolactone (GBL) and the like as a high-permittivity solvent, and at least one selected from diethyl carbonate (DEC), dimethyl carbonate (DMC), ethyl methyl carbonate (EMC), esters and the like as a low-viscosity solvent. The mixed liquid is preferably EC+DEC, EC+EMC, EC+DMC, PC+DEC, PC+EMC, PC+DMC, PC+EC+DEC and the like. However, since the negative electrode active material is a graphite, the mixing ratio of PC is desirably so low a ratio as not to cause a reductive decomposition reaction of the PC itself after a sulfonate ester having at least two sulfonyl groups according to the present exemplary embodiment is reduced at initial charge prior to PC and a dense film (SEI) is formed on a negative electrode. In the case where the purity of a solvent is low and in the case where the amount of the contained moisture is large, the mixing ratio of a solvent species having a potential window broad to a high potential side is preferably raised.

As a supporting salt contained in an aprotic electrolyte solution, at least one selected from $LiBF_4$, $LiPF_6$, $LiClO_4$, $LiAsF_6$, $Li(CF_3SO_2)N$, $Li(C_2F_5SO_2)_2N$ and the like can be used, and $LiPF_6$ is preferably used. The concentration of a supporting salt is preferably 0.8 to 1.5 mol/L, and more preferably 0.9 to 1.2 mol/L.

A sulfonate ester having at least two sulfonyl groups contained in an aprotic electrolyte solution is preferably a cyclic sulfonate ester represented by the following formula (1) or a chain sulfonate ester represented by the following formula (2).

[Formula 3]

(1)

wherein Q denotes an oxygen atom, a methylene group or a single bond; A1 denotes a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which alkylene units or fluoroalkylene units are bonded through an ether bond; and A2 denotes a substituted or unsubstituted alkylene group, a substituted or unsubstituted fluoroalkylene group or an oxygen atom.

[Formula 4]

(2)

wherein $R_1$ and $R_4$ each independently denote an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_1$ (wherein $X_1$ is a substituted or unsubstituted alkyl group having 1 to 5 carbon atoms), —$SY_1$ (wherein $Y_1$ is a substituted or unsubstituted alkyl group having 1 to 5 carbon atoms), —COZ (wherein Z is a hydrogen atom or a substituted or unsubstituted alkyl group having 1 to 5 carbon atoms), and a halogen atom; and $R_2$ and $R_3$ each independently denote an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_2X_3$ (wherein $X_2$ and $X_3$ are each independently a hydrogen atom or a substituted or unsubstituted alkyl group having 1 to 5 carbon atoms), and —$NY_2CONY_3Y_4$ (wherein $Y_2$ to $Y_4$ are each independently a hydrogen atom or a substituted or unsubstituted alkyl group having 1 to 5 carbon atoms).

Representative examples of a cyclic sulfonate ester represented by the above formula (1) are specifically shown in Table 1 and representative examples of a chain sulfonate ester represented by the above formula (2) are specifically shown in Table 2, but the present exemplary embodiment is not limited thereto.

TABLE 1-continued

| Compound No. | Chemical Structure |
|---|---|
| 12 | (cyclic structure with two SO2 groups, O, and S=O) |
| 13 | (cyclic structure with two SO2 groups, O, S=O, and C(CH3)2) |
| 14 | (cyclic structure with two SO2 groups, O, S=O, and CF2) |
| 15 | (cyclic structure with two SO2 groups, O, and CF2) |
| 16 | (cyclic structure with two SO2 groups, O, and (CF2)2) |
| 17 | (cyclic structure with two SO2 groups, O, CH2CH2, and CF2) |
| 18 | (cyclic structure with two SO2 groups, O, H2C, CH2, O, CH2, O) |
| 19 | (cyclic structure with two SO2 groups, O, F2C, CF3, O, CF2, O) |
| 20 | (cyclic structure with two SO2 groups, O, H2C, CH2, O, CF2, O) |
| 21 | (cyclic structure with two SO2 groups, O, O, and CH2CH2) |
| 22 | (cyclic structure with two SO2 groups, O, O, and CH2) |

TABLE 2

| Compound No. | Chemical Structure |
|---|---|
| 101 | CH2(SO2—OCH3)2 |
| 102 | CH2(SO2—OCH2CH3)2 |
| 103 | CH2(SO2—CH(CH3)2)2 |
| 104 | CH(CH3)(SO2—OCH3)2 |
| 105 | C(CH3)2(SO2—OCH3)2 |
| 106 | CH2(SO2—CH2)(SO2—OCH2CH2CH3) |

TABLE 2-continued

| Compound No. | Chemical Structure |
|---|---|
| 107 | CH₃SO₂CH₂SO₂OCH₂CH₂Cl |
| 108 | CH₃OCH(SO₂OCH₃)₂ |
| 109 | CF₂(SO₂OCH₃)₂ |
| 110 | HOSO₂CH₂SO₂OCH₃ |
| 111 | ClSO₂CH₂SO₂OCH₂CH₂OH |
| 112 | ClSO₂CH₂SO₂OCH₂CH₂OSO₂CH₂SO₂Cl |
| 113 | CF₂CF₂OSO₂CH₂SO₂OCF₂CF₂ |
| 114 | H₂NSO₂CH₂SO₂NH₂ |
| 115 | H₂NSO₂CH₂SO₂OC₃H₅ |
| 116 | C₃H₅OSO₂CH₂SO₂OC₃H₅ |
| 117 | H₂NCONHSO₂CH₂SO₂NHCONH₂ |
| 118 | O=CH—CH(SO₂OH)₂ |
| 119 | CH₃SO₂CH(SO₂OC₃H₅)₂ |
| 120 | CH₃CH₂SCH(SO₂OC₃H₅)₂ |

A positive electrode sheet and a negative electrode sheet are laminated or wound with a separator sandwiched therebetween, and enclosed in a packaging material including a laminate film with an electrolyte solution injection portion left unsealed. The laminate film is preferably an aluminum laminate film. An aprotic electrolyte solution is injected from the electrolyte solution injection portion, and the laminate film is vacuum sealed. A lithium ion secondary battery before pre-charge is thereby fabricated.

The fabricated lithium ion secondary battery before pre-charge is pre-charged at a current value of 0.05 C or larger and 0.25 C or smaller (wherein C refers to hour rate, and 1 C is a current value at which the charge/discharge is completed in 1 hour) and at 3.3 V or higher and 3.5 V or lower.

In the case where the current value in pre-charge is smaller than 0.05 C, the time is much taken to complete the pre-charge, which is not practical. By contrast, if the current value in pre-charge exceeds 0.25 C, a sufficient film formation on a negative electrode is not made.

In the case where the voltage in pre-charge is lower than 3.3 V, since unreacted additives much remain and portions of a negative electrode where no film formation is made are generated, gases are generated and deposits are generated on a negative electrode active material layer by reaction of the additives in regular charge, thus decreasing the cycle characteristics. By contrast, if the voltage in pre-charge exceeds 3.5 V, since intercalation of lithium ions in the negative electrode progresses as the gases generated in pre-charge are present, a lithium compound deposits on the negative electrode active material, thus decreasing the cycle characteristics.

The pre-charge is preferably carried out at 10° C. or higher and lower than 30° C. Making the temperature in pre-charge to be 10° C. or higher can suppress a decrease in the ionic conductivity of an aprotic electrolyte solution, and make sufficient film formation and charge. Further making the temperature in pre-charge to be lower than 30° C. can suppress gasification of the aprotic electrolyte solution in the secondary battery.

In order to release gases which may be generated in pre-charge, the laminate film of lithium ion secondary battery after pre-charge needs to be made unsealed. Thereafter, the laminate film is again vacuum sealed. Then, regular charge is carried out to thereby complete a lithium ion secondary battery. The condition of the regular charge depends on the design of a secondary battery required. As one example, a constant-current constant-voltage charge at a current value of 0.25 C for 8 hours to a designed voltage can be carried out.

EXAMPLES

Hereinafter, Examples according to the present exemplary embodiment will be described in detail.

Example 1

(Fabrication of a Lithium Ion Secondary Battery)

A mixture of lithium manganate and lithium nickelate (lithium manganate:lithium nickelate=80:20 (% by weight)) as a positive electrode active material, and a conductivity imparting agent were dry mixed, and homogeneously dispersed in N-methyl-2-pyrrolidone (NMP) containing PVdF as a binder dissolved therein to thereby fabricate a slurry. The slurry was applied on an aluminum metal foil having a thickness of 20 μm, and thereafter, NMP was vaporized to form a positive electrode active material layer to thereby fabricate a positive electrode sheet. The solid content ratio in the positive electrode active material layer was made to be lithium manganate:lithium nickelate:the conductivity imparting agent: PVdF=72:18:6:4 in mass ratio (% by weight). An unapplied portion (width: 55 mm, height: 100 mm) of the aluminum metal foil of the positive electrode sheet was punched into a shape 10 mm wide and 15 mm high for current extraction.

A graphite as a negative electrode active material was homogeneously dispersed in NMP containing PVdF as a binder dissolved therein to thereby fabricate a slurry; the slurry was applied on a copper foil having a thickness of 10 μm, and thereafter, NMP was evaporated to form a negative electrode active material layer to thereby fabricate a negative electrode sheet. The graphite used was one which had an average particle diameter ($D_{50}$) of 31 μm and a B.E.T specific surface area of 0.8 m$^2$/g. The solid content ratio in the negative electrode active material layer was made to be the graphite:PVdF=90:10 in mass ratio. An unapplied portion (width: 59 mm, height: 104 mm) of the copper foil of the negative electrode sheet was punched into a shape of 10 mm wide and 15 mm high for current extraction.

14 sheets of the negative electrode sheet and 13 sheets of the positive electrode sheet thus fabricated were laminated with a porous film separator having a three-layered structure of a polypropylene/a polyethylene/a polypropylene having a thickness of 25 μm sandwiched therebetween, to thereby fabricate a laminated body being a battery element. At this time, the laminated body was fabricated so that the respective unapplied portions of the positive electrode sheet and the negative electrode sheet were made on the same side. An aluminum tab for external current extraction was ultrasonically welded on the positive electrode sheet of the laminated body; and a nickel tab for external current extraction, on the negative electrode sheet. A laminate film embossed in conformance with the shape of the obtained laminated body and a planar laminate film were thermally fused so as to involve the laminated body, with an electrolyte solution injection portion left unfused.

As an aprotic electrolyte solution, an electrolyte solution was prepared which contained 1 mol/L of $LiPF_6$ as a supporting salt and a mixed liquid of ethylene carbonate (EC) and diethyl carbonate (DEC) (EC:DEC=30:70 (volume ratio)) as a solvent. In the electrolyte solution, a cyclic sulfonate ester represented as Compound No. 1 in Table 1 as a sulfonate ester having at least two sulfonyl groups was mixed as an additive so that the content became 1.6% by weight with respect to the electrolyte solution. The electrolyte solution was injected from the electrolyte solution injection portion; and the laminate film was vacuum sealed. A lithium ion secondary battery before pre-charge was thereby fabricated.

The fabricated lithium ion secondary battery before pre-charge was pre-charged under an environment of 25° C. ±4° C. at a current value of 0.05 C (wherein C refers to hour rate, and 1 C is a current value at which the charge/discharge is completed in 1 hour) for 1 hour to 3.3 V. Thereafter, the laminate film was once made unsealed, and again vacuum sealed; and thereafter, a constant-current constant-voltage charge as regular charge was carried out at 0.25 C for 8 hours to 4.2 V. A lithium ion secondary battery was thereby fabricated.

Example 2

A laminate-outer packed lithium ion secondary battery was fabricated as in Example 1, except for carrying out the pre-charge at a current value of 0.05 C to 3.5 V.

Example 3

A laminate-outer packed lithium ion secondary battery was fabricated as in Example 1, except for carrying out the pre-charge at a current value of 0.25 C to 3.3 V.

Example 4

A laminate-outer packed lithium ion secondary battery was fabricated as in Example 1, except for carrying out the pre-charge at a current value of 0.25 C to 3.5 V.

Example 5

A laminate-outer packed lithium ion secondary battery was fabricated as in Example 1, except for using a cyclic sulfonate ester represented as Compound No. 4 in Table 1 as a sulfonate ester having at least two sulfonyl groups.

Example 6

A laminate-outer packed lithium ion secondary battery was fabricated as in Example 1, except for using a cyclic sulfonate ester represented as Compound No. 9 in Table 1 as a sulfonate ester having at least two sulfonyl groups.

Comparative Example 1

A laminate-outer packed lithium ion secondary battery was fabricated as in Example 1, except for carrying out the pre-charge at a current value of 0.05 C to 3.2 V.

Comparative Example 2

A laminate-outer packed lithium ion secondary battery was fabricated as in Example 1, except for carrying out the pre-charge at a current value of 0.05 C to 3.6 V.

Comparative Example 3

A laminate-outer packed lithium ion secondary battery was fabricated as in Example 1, except for carrying out the pre-charge at a current value of 0.30 C to 3.2 V.

Comparative Example 4

A laminate-outer packed lithium ion secondary battery was fabricated as in Example 1, except for carrying out the pre-charge at a current value of 0.30 C to 3.6 V.

Comparative Example 5

A laminate-outer packed lithium ion secondary battery was fabricated as in Comparative Example 1, except for using a cyclic sulfonate ester represented as Compound No. 4 in Table 1 as a sulfonate ester having at least two sulfonyl groups.

Comparative Example 6

A laminate-outer packed lithium ion secondary battery was fabricated as in Comparative Example 1, except for using a cyclic sulfonate ester represented as Compound No. 9 in Table 1 as a sulfonate ester having at least two sulfonyl groups.

(Observation of Surfaces of Negative Electrode Active Material Layers of Negative Electrode Sheets after Initial Charge/Discharge)

Figure 2:
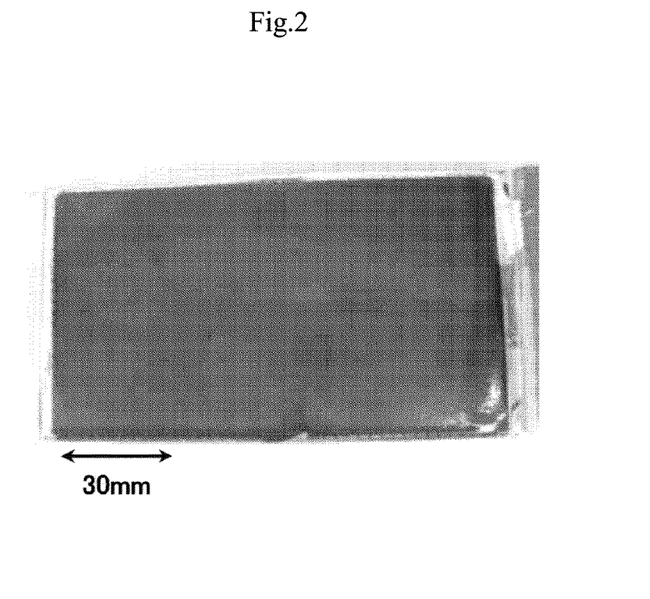
FIG. 2 is a photograph of a negative electrode active material layer surface of a negative electrode sheet of Example 1.
Figure 3:
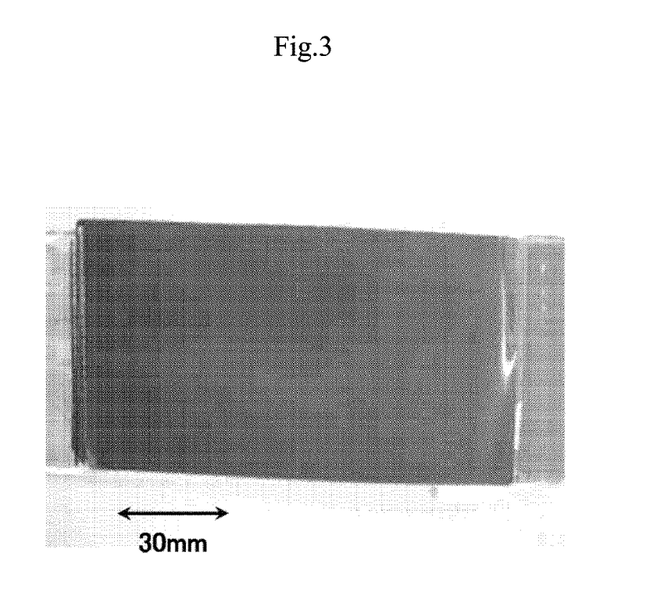
FIG. 3 is a photograph of a negative electrode active material layer surface of a negative electrode sheet of Example 4.
Figure 4:
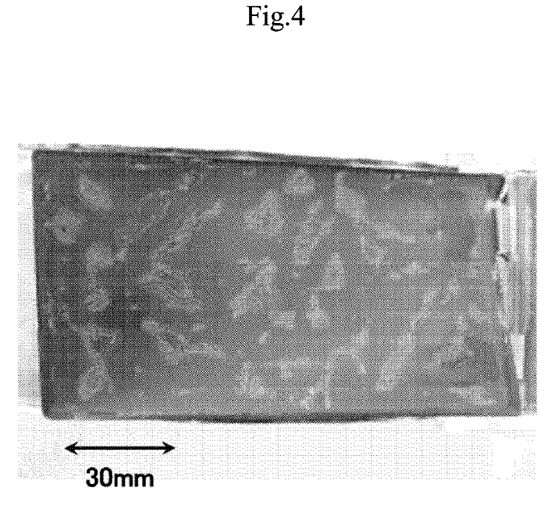
FIG. 4 is a photograph of a negative electrode active material layer surface of a negative electrode sheet of Comparative Example 1.
Figure 5:
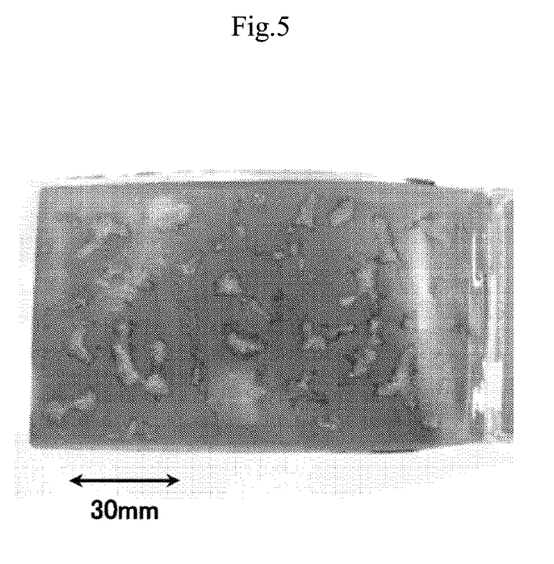
FIG. 5 is a photograph of a negative electrode active material layer surface of a negative electrode sheet of Comparative Example 4.

The laminate-outer packed lithium ion secondary batteries fabricated under these conditions were disassembled after initial charge/discharge, and surfaces of the negative electrode active material layers of the negative electrode sheets were observed. FIG. 2 is a photograph of a negative electrode active material layer surface of the negative electrode sheet of Example 1; FIG. 3 is a photograph of a negative electrode active material layer surface of the negative electrode sheet of Example 4; FIG. 4 is a photograph of a negative electrode active material layer surface of the negative electrode sheet of Comparative Example 1; and FIG. 5 is a photograph of a negative electrode active material layer surface of the negative electrode sheet of Comparative Example 4. In FIG. 2 and FIG. 3, no deposits were observed on the negative electrode active material layers of the negative electrode sheets. By contrast, in FIG. 4 and FIG. 5, deposits were observed on the negative electrode active material layers of the negative electrode sheets.

As results of observations of the negative electrode active material layer surfaces of the negative electrode sheets, in Examples 1 to 6, no deposits were observed on the negative electrode active material layer surfaces; and in Comparative Examples 1 to 6, deposits were observed. The deposits were examined for the bond energies of the Is electrons of Li by X-ray photoelectron spectroscopy (XPS), and peaks were observed at 55.6 eV. This revealed that the deposits were not metallic Li (54.7 eV), but a lithium compound. However, if water was dropped on the deposits, since a reaction involving gas generation was observed, the deposits were found to be a lithium compound having a high reaction activity.

(Evaluation of the Cycle Characteristics)

The laminate-outer packed lithium ion secondary batteries fabricated under these conditions were evaluated for the cycle characteristics to 300 cycles in which the batteries were repeatedly subjected to a constant-current constant-voltage charge at a current value of 1 C for 2.5 hours to 4.2 V and a constant-current discharge at a current value of 1 C to 3.0 V, under an environment of 45° C.

Table 3 shows results of the pre-charge currents, the pre-charge voltages, the kinds and the amounts of the additives added to the electrolyte solutions, the presence/absence of deposits on the negative electrodes after initial charge/discharge, and the capacity retention rates after 300 cycles, of Examples 1 to 6 and Comparative Examples 1 to 6. The capacity retention rates after 300 cycles are values obtained by dividing the discharge capacities after 300 cycles by the discharge capacities at 10th cycle.

TABLE 3

|  | Pre-Charge Current | Pre-Charge Voltage | Kind and Amount of Additive Added to Electrolyte Solution | Presence/ Absence of Deposit on Negative Electrode | Capacity Retention rate after 300 Cycles (%) |
| --- | --- | --- | --- | --- | --- |
| Example 1 | 0.05 C | 3.3 V | Compound No. 1- 1.6 wt % | Absence | 85.3 |
| Example 2 | 0.05 C | 3.5 V | Compound No. 1- 1.6 wt % | Absence | 85.9 |
| Example 3 | 0.25 C | 3.3 V | Compound No. 1- 1.6 wt % | Absence | 84.1 |
| Example 4 | 0.25 C | 3.5 V | Compound No. 1- 1.6 wt % | Absence | 84.3 |
| Example 5 | 0.05 C | 3.3 V | Compound No. 4- 1.6 wt % | Absence | 85.1 |
| Example 6 | 0.05 C | 3.3 V | Compound No. 9- 1.6 wt % | Absence | 85.0 |
| Comparative Example 1 | 0.05 C | 3.2 V | Compound No. 1- 1.6 wt % | Presence | 70.2 |
| Comparative | 0.05 C | 3.6 V | Compound No. 1- | Presence | 74.1 |

TABLE 3-continued

|  | Pre-Charge Current | Pre-Charge Voltage | Kind and Amount of Additive Added to Electrolyte Solution | Presence/ Absence of Deposit on Negative Electrode | Capacity Retention rate after 300 Cycles (%) |
|---|---|---|---|---|---|
| Example 2 |  |  | 1.6 wt % |  |  |
| Comparative Example 3 | 0.30 C | 3.2 V | Compound No. 1-1.6 wt % | Presence | 70.5 |
| Comparative Example 4 | 0.30 C | 3.6 V | Compound No. 1-1.6 wt % | Presence | 75.1 |
| Comparative Example 5 | 0.05 C | 3.2 V | Compound No. 4-1.6 wt % | Presence | 69.9 |
| Comparative Example 6 | 0.05 C | 3.2 V | Compound No. 9-1.6 wt % | Presence | 71.2 |

From these results, it was found that in the case where the pre-charge was carried out at a current of 0.05 C or larger and 0.25 C or smaller and at a voltage of 3.3 V or higher and 3.5 V or lower, there were no deposits of lithium compound on the negative electrode active material layers, and the capacity retention rates were high.

It is clear from the above results that in the case of using a cyclic sulfonate ester having at least two sulfonyl groups as an additive to an electrolyte solution, carrying out the pre-charge at a current of 0.05 C or larger and 0.25 C or smaller and at a voltage of 3.3 V or higher and 3.5 V or lower was effective to raise the capacity retention rate.

Example 7

As a sulfonate ester having at least two sulfonyl groups, a chain sulfonate ester represented by Compound No. 101 in Table 2 was mixed in an electrolyte solution so that the content became 1.7% by weight with respect to the electrolyte solution. A lithium ion secondary battery was fabricated as in Example 1, except for this condition.

Example 8

A laminate-outer packed lithium ion secondary battery was fabricated as in Example 7, except for carrying out the pre-charge at a current value of 0.05 C to 3.5 V.

Example 9

A laminate-outer packed lithium ion secondary battery was fabricated as in Example 7, except for carrying out the pre-charge at a current value of 0.25 C to 3.3 V.

Example 10

A laminate-outer packed lithium ion secondary battery was fabricated as in Example 7, except for carrying out the pre-charge at a current value of 0.25 C to 3.5 V.

Example 11

A laminate-outer packed lithium ion secondary battery was fabricated as in Example 7, except for using a chain sulfonate ester represented as Compound No. 102 in Table 2 as a sulfonate ester having at least two sulfonyl groups.

Example 12

A laminate-outer packed lithium ion secondary battery was fabricated as in Example 7, except for using a chain sulfonate ester represented as Compound No. 116 in Table 2 as a sulfonate ester having at least two sulfonyl groups.

Comparative Example 7

A laminate-outer packed lithium ion secondary battery was fabricated as in Example 7, except for carrying out the pre-charge at a current value of 0.05 C to 3.2 V.

Comparative Example 8

A laminate-outer packed lithium ion secondary battery was fabricated as in Example 7, except for carrying out the pre-charge at a current value of 0.05 C to 3.6 V.

Comparative Example 9

A laminate-outer packed lithium ion secondary battery was fabricated as in Example 7, except for carrying out the pre-charge at a current value of 0.30 C to 3.2 V.

Comparative Example 10

A laminate-outer packed lithium ion secondary battery was fabricated as in Example 7, except for carrying out the pre-charge at a current value of 0.30 C to 3.6 V.

Comparative Example 11

A laminate-outer packed lithium ion secondary battery was fabricated as in Comparative Example 7, except for using a chain sulfonate ester represented as Compound No. 102 in Table 2 as a sulfonate ester having at least two sulfonyl groups.

Comparative Example 12

A laminate-outer packed lithium ion secondary battery was fabricated as in Comparative Example 7, except for using a chain sulfonate ester represented as Compound No. 116 in Table 2 as a sulfonate ester having at least two sulfonyl groups.

(Observation of Surfaces of Negative Electrode Active Material Layers after Initial Charge/Discharge)

The laminate-outer packed lithium ion secondary batteries fabricated under these conditions were disassembled after initial charge/discharge, and surfaces of the negative electrode active material layers of the negative electrode sheets were observed as described above. As results, in Examples 7 to 12, no deposits were observed on the negative electrode active material layer surfaces; and in Comparative Examples 7 to 12, deposits were observed. It was found from the XPS analysis that the deposits observed on the negative electrode active material layers were not the lithium metal, but a lithium compound.

(Evaluation of the Cycle Characteristics)

The laminate-outer packed lithium ion secondary batteries fabricated under these conditions were evaluated for the cycle characteristics to 300 cycles in which the batteries were repeatedly subjected to a constant-current constant-voltage charge at a current value of 1 C for 2.5 hours to 4.2 V and a constant-current discharge at a current value of 1 C to 3.0 V, under an environment of 45° C. as described above.

Table 4 shows results of the pre-charge currents, the pre-charge voltages, the kinds and the amounts of the additives added to the electrolyte solutions, the presence/absence of deposits on the negative electrodes after initial charge/discharge, and the capacity retention rates after 300 cycles, of Examples 7 to 12 and Comparative Examples 7 to 12.

TABLE 4

|  | Pre-Charge Current | Pre-Charge Voltage | Kind and Amount of Additive Added to Electrolyte Solution | Presence/ Absence of Deposit on Negative Electrode | Capacity Retention rate after 300 Cycles (%) |
|---|---|---|---|---|---|
| Example 7 | 0.05 C | 3.3 V | Compound No. 101-1.7 wt % | Absence | 85.9 |
| Example 8 | 0.05 C | 3.5 V | Compound No. 101-1.7 wt % | Absence | 83.9 |
| Example 9 | 0.25 C | 3.3 V | Compound No. 101-1.7 wt % | Absence | 86.0 |
| Example 10 | 0.25 C | 3.5 V | Compound No. 101-1.7 wt % | Absence | 84.8 |
| Example 11 | 0.05 C | 3.3 V | Compound No. 102-1.7 wt % | Absence | 85.1 |
| Example 12 | 0.05 C | 3.3 V | Compound No. 116-1.7 wt % | Absence | 84.2 |
| Comparative Example 7 | 0.05 C | 3.2 V | Compound No. 101-1.7 wt % | Presence | 67.2 |
| Comparative Example 8 | 0.05 C | 3.6 V | Compound No. 101-1.7 wt % | Presence | 71.1 |
| Comparative Example 9 | 0.30 C | 3.2 V | Compound No. 101-1.7 wt % | Presence | 66.3 |
| Comparative Example 10 | 0.30 C | 3.6 V | Compound No. 101-1.7 wt % | Presence | 69.4 |
| Comparative Example 11 | 0.05 C | 3.2 V | Compound No. 102-1.7 wt % | Presence | 63.3 |
| Comparative Example 12 | 0.05 C | 3.2 V | Compound No. 116-1.7 wt % | Presence | 66.0 |

From these results, it was found also in the case where the chain sulfonate esters of Compound No. 101 and the like were used as an additive to the electrolyte solution that in the case where the pre-charge was carried out at a current of 0.05 C or larger and 0.25 C or smaller and at a voltage of 3.3 V or higher and 3.5 V or lower, no lithium compound deposited on the negative electrode active material layers, and the capacity retention rates were high.

It is clear from the above results that in the case of using a chain sulfonate ester having at least two sulfonyl groups as an additive to an electrolyte solution, carrying out the pre-charge at a current of 0.05 C or larger and 0.25 C or smaller and at a voltage of 3.3 V or higher and 3.5 V or lower was effective to raise the capacity retention rate.

According to the present exemplary embodiment, it was confirmed that a lithium ion secondary battery can be provided in which no lithium compound deposits on the negative electrode active material layer and which exhibits a high capacity retention rate over a long period.

The present application claims priority to Japanese Patent Application 2009-263433, filed on Nov. 19, 2009, the disclosure of which is incorporated herein in its entirety.

Hitherto, the present invention has been described by reference to the exemplary embodiment (and Examples), but the present invention is not limited to the exemplary embodiment (and the Examples). In the constitution and the detail of the present invention, various changes understandable to those skilled in the art may be made within the scope of the present invention.

REFERENCE SIGNS LIST

1 LITHIUM ION SECONDARY BATTERY
3 BATTERY ELEMENT
5 FILMY PACKAGING MATERIAL
7 SEALING PORTION
10 POSITIVE ELECTRODE SHEET
11 POSITIVE ELECTRODE CURRENT COLLECTOR
13 POSITIVE ELECTRODE ACTIVE MATERIAL LAYER
19 POSITIVE ELECTRODE LEAD TERMINAL
20 NEGATIVE ELECTRODE SHEET
21 NEGATIVE ELECTRODE CURRENT COLLECTOR
23 NEGATIVE ELECTRODE ACTIVE MATERIAL LAYER
29 NEGATIVE ELECTRODE LEAD TERMINAL
30 SEPARATOR

The invention claimed is:

1. A method for manufacturing a lithium ion secondary battery,
the lithium ion secondary battery comprising:
a positive electrode;
a negative electrode comprising a negative electrode active material layer comprising a graphite;
an aprotic electrolyte solution comprising a sulfonate ester having at least two sulfonyl groups; and
a packaging material comprising a laminate film involving the positive electrode, the negative electrode and the aprotic electrolyte solution, and the method comprising:

enclosing the positive electrode, the negative electrode and the aprotic electrolyte solution in the packaging material to fabricate a lithium ion secondary battery before pre-charge;

pre-charging the lithium ion secondary battery at a current value of between 0.05 C and 0.25 C to a voltage between 3.3 V and 3.5 V; and opening the enclosure of the packaging material of the lithium ion secondary battery after pre-charge, thereafter vacuum sealing the packaging material, and regularly charging the lithium ion secondary battery after pre-charge.

2. The method for manufacturing a lithium ion secondary battery according to claim 1, wherein the sulfonate ester is a cyclic sulfonate ester represented by the following formula (1):

[Formula 1]

(1)

wherein Q denotes an oxygen atom, a methylene group or a single bond; A1 denotes a substituted or unsubstituted alkylene group having 1 to 5 carbon atoms, a carbonyl group, a sulfinyl group, a substituted or unsubstituted fluoroalkylene group having 1 to 6 carbon atoms, or a divalent group having 2 to 6 carbon atoms in which alkylene units or fluoroalkylene units are bonded through an ether bond; and A2 denotes a substituted or unsubstituted alkylene group, a substituted or unsubstituted fluoroalkylene group or an oxygen atom.

3. The method for manufacturing a lithium ion secondary battery according to claim 1, wherein the sulfonate ester is a chain sulfonate ester represented by the following formula (2):

[Formula 2]

(2)

wherein $R_1$ and $R_4$ each independently denote an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, —$SO_2X_1$ (wherein $X_1$ is a substituted or unsubstituted alkyl group having 1 to 5 carbon atoms), —$SY_1$ (wherein $Y_1$ is a substituted or unsubstituted alkyl group having 1 to 5 carbon atoms), —COZ (wherein Z is a hydrogen atom or a substituted or unsubstituted alkyl group having 1 to 5 carbon atoms), and a halogen atom; and $R_2$ and $R_3$ each independently denote an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —NX2X3 (wherein X2 and X3 are each independently a hydrogen atom or a substituted or unsubstituted alkyl group having 1 to 5 carbon atoms), and —NY2CONY3Y4 (wherein Y2 to Y4 are each independently a hydrogen atom or a substituted or unsubstituted alkyl group having 1 to 5 carbon atoms).

4. The method for manufacturing a lithium ion secondary battery according to claim 1, wherein the pre-charge is carried out at a temperature between 10° C. and 30° C.

5. The method for manufacturing a lithium ion secondary battery according to claim 1, wherein a battery element comprising the positive electrode and the negative electrode enclosed in the packaging material has a laminated structure.

\* \* \* \* \*

UNITED STATES PATENT AND TRADEMARK OFFICE
CERTIFICATE OF CORRECTION

PATENT NO. : 8,814,955 B2  
APPLICATION NO. : 13/510819  
DATED : August 26, 2014  
INVENTOR(S) : Tomokazu Kumeuchi, Koichi Zama and Daisuke Kono It is certified that error appears in the above-identified patent and that said Letters Patent is hereby corrected as shown below:

In the Claims

Column 22, Line 31: In Claim 3, delete "–NX2X3" and insert -- $-NX_2X_3$ --

Column 22, Line 32: In Claim 3, delete "X2 and X3" and insert -- $X_2$ and $X_3$ --

Column 22, Line 34: In Claim 3, delete "–NY2CONY3Y4" and insert -- $-NY_2CONY_3Y_4$ --

Column 22, Line 34: In Claim 3, delete "Y2 to Y4" and insert -- $Y_2$ to $Y_4$ --

Signed and Sealed this  
Tenth Day of February, 2015

Michelle K. Lee  
*Deputy Director of the United States Patent and Trademark Office*